(12) United States Patent
Brun

(10) Patent No.: US 7,559,097 B2
(45) Date of Patent: Jul. 14, 2009

(54) SO-CALLED FOLD-AWAY BED

(76) Inventor: Giancarlo Brun, Via Nazario Sauro, 191-36016 Thiene (VI) (IT)

( * ) Notice: Subject to any disclaimer, the term of this patent is extended or adjusted under 35 U.S.C. 154(b) by 347 days.

(21) Appl. No.: 10/571,686

(22) PCT Filed: Sep. 1, 2004

(86) PCT No.: PCT/EP2004/009720

§ 371 (c)(1),
(2), (4) Date: Mar. 13, 2006

(87) PCT Pub. No.: WO2005/023058

PCT Pub. Date: Mar. 17, 2005

(65) Prior Publication Data

US 2007/0056094 A1 Mar. 15, 2007

(30) Foreign Application Priority Data

Sep. 11, 2003 (IT) .......................... VI2003A0172

(51) Int. Cl.
*A47C 17/84* (2006.01)
(52) U.S. Cl. .................... 5/10.1; 5/10.2; 5/11
(58) Field of Classification Search ............ 5/10.1, 5/10.2, 11, 9.1, 8
See application file for complete search history.

(56) References Cited

U.S. PATENT DOCUMENTS

| 289,346 | A | * | 11/1883 | Hale ......................... 105/321 |
| 509,944 | A | * | 12/1893 | Rapp ......................... 105/321 |
| 931,962 | A | * | 8/1909 | Rountree ...................... 5/10.2 |
| 1,065,287 | A | * | 6/1913 | Welch ......................... 5/10.2 |
| 1,945,875 | A | * | 2/1934 | Woller ......................... 5/10.2 |
| 2,112,355 | A | * | 3/1938 | Archer ......................... 5/10.2 |
| 2,654,895 | A | * | 10/1953 | Stevens .......................... 5/9.1 |
| 2,730,213 | A | * | 1/1956 | Mason et al. ................. 477/21 |
| 2,968,048 | A | * | 1/1961 | Roberge ....................... 5/10.1 |
| 3,480,975 | A | * | 12/1969 | Racine et al. ................... 5/118 |
| 3,660,591 | A | * | 5/1972 | Schultz et al. ............ 174/70 R |
| 3,665,527 | A | * | 5/1972 | Gonzalez ...................... 5/10.2 |
| 3,882,554 | A | | 5/1975 | Glass |
| 4,058,860 | A | * | 11/1977 | Daidone ....................... 5/10.1 |
| 4,837,877 | A | * | 6/1989 | Hamada et al. ............... 5/10.2 |
| 5,020,169 | A | * | 6/1991 | Hamada et al. ............... 5/10.2 |
| 5,363,520 | A | * | 11/1994 | Lyne, Jr. ......................... 5/11 |
| 5,502,850 | A | * | 4/1996 | Lyne, Jr. ......................... 5/11 |
| 5,943,714 | A | | 8/1999 | Dignam |

(Continued)

FOREIGN PATENT DOCUMENTS

CA 2 351 214 A 12/2002

(Continued)

*Primary Examiner*—Robert G Santos
(74) *Attorney, Agent, or Firm*—Birch, Stewart, Kolasch & Birch LLP

(57) ABSTRACT

The invention concerns a so-called fold-away bed, to be used in the fields of camping, seamanship, furnishing of bedsits and in all other dwellings where there is a lack of space, for which reason the components of the furniture must take up a minimum amount of space. Such a bed is characterised in that, in rest state, it is lifted until it comes into contact with the ceiling of the room in which it is inserted. In the dependant claims of the finding there are also special means that allow said bed to be moved.

11 Claims, 15 Drawing Sheets

U.S. PATENT DOCUMENTS

| | | | | |
|---|---|---|---|---|
| 5,984,404 | A * | 11/1999 | Novoa et al. | 296/190.02 |
| 5,991,947 | A * | 11/1999 | Lavin et al. | 5/600 |
| 6,507,962 | B2 * | 1/2003 | Thurston | 5/10.1 |
| 6,829,791 | B2 * | 12/2004 | Roepke | 5/10.1 |
| 7,178,180 | B2 * | 2/2007 | Gardner | 5/10.1 |
| 7,444,691 | B2 * | 11/2008 | Gardner | 5/10.1 |
| 2002/0046423 | A1 | 4/2002 | Vilsmeier | |
| 2002/0178497 | A1 * | 12/2002 | Thurston | 5/10.1 |
| 2004/0143901 | A1 * | 7/2004 | Roepke | 5/10.2 |
| 2006/0162067 | A1 * | 7/2006 | Roepke | 5/10.1 |
| 2007/0056094 | A1 * | 3/2007 | Brun | 5/10.2 |

FOREIGN PATENT DOCUMENTS

| | | |
|---|---|---|
| CH | 671 868 A | 10/1989 |
| EP | 0 418 415 A | 3/1991 |
| EP | 0 469 212 A | 2/1992 |
| FR | 2 826 844 | 1/2003 |
| GB | 2 276 315 A | 9/1994 |

* cited by examiner

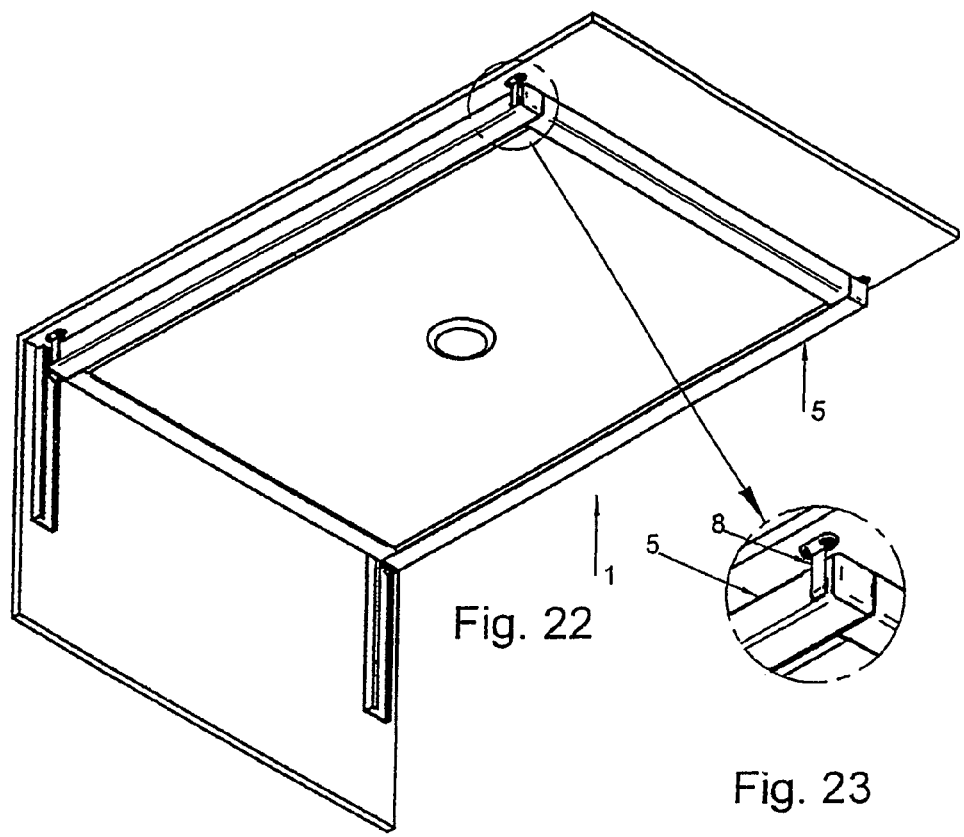
Fig. 22
Fig. 23
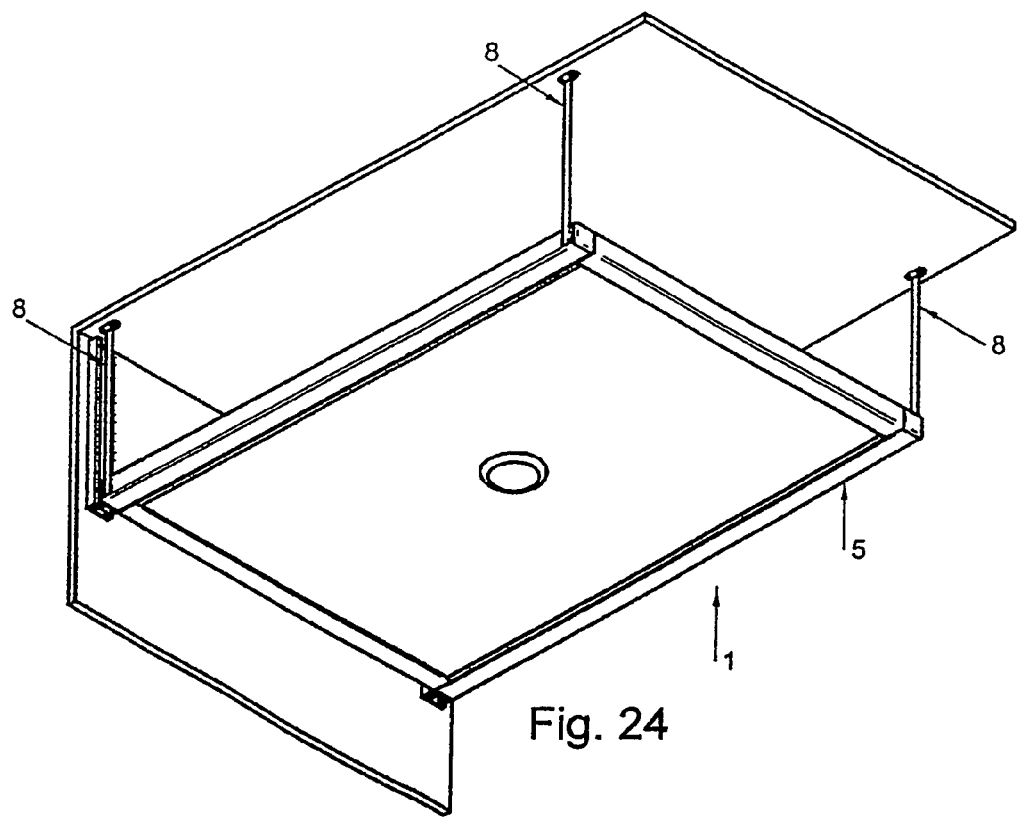
Fig. 24

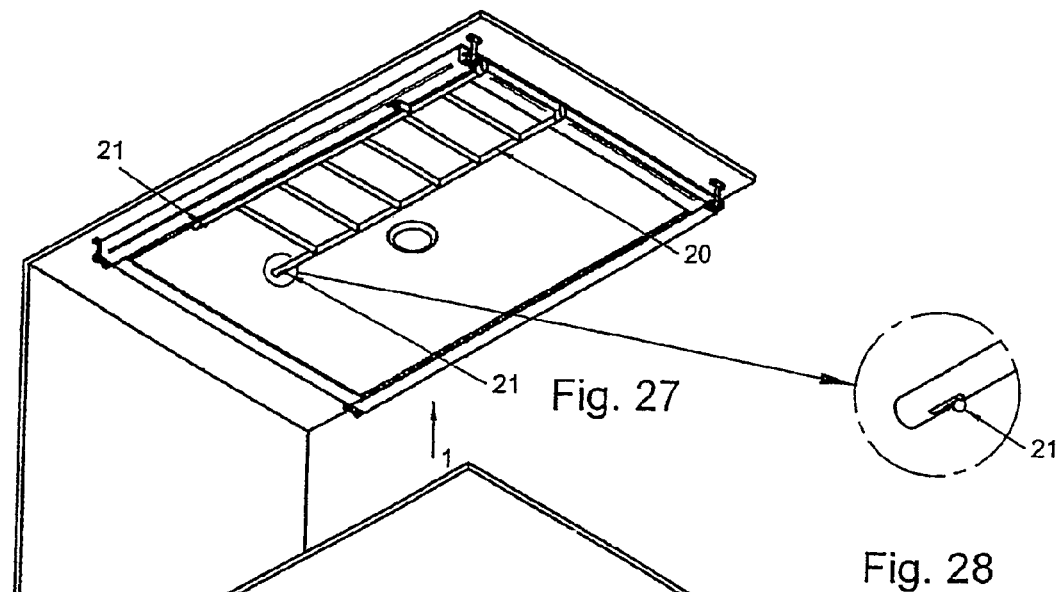
Fig. 27
Fig. 28
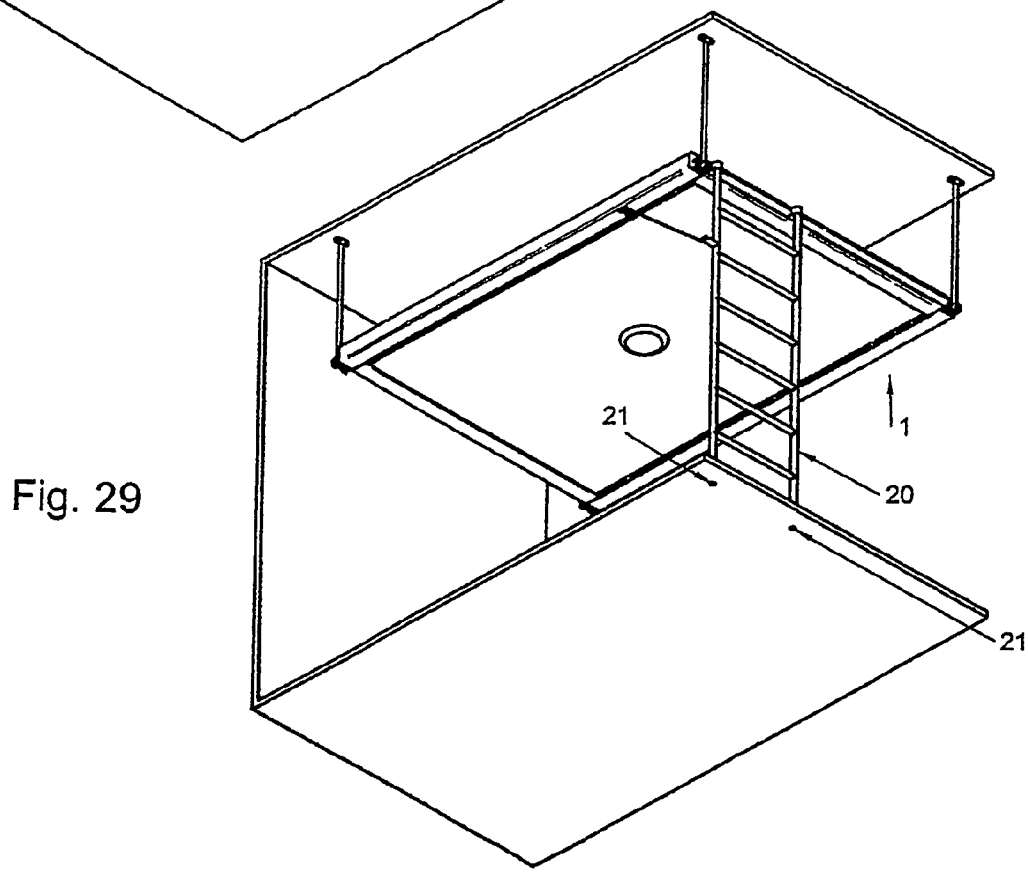
Fig. 29

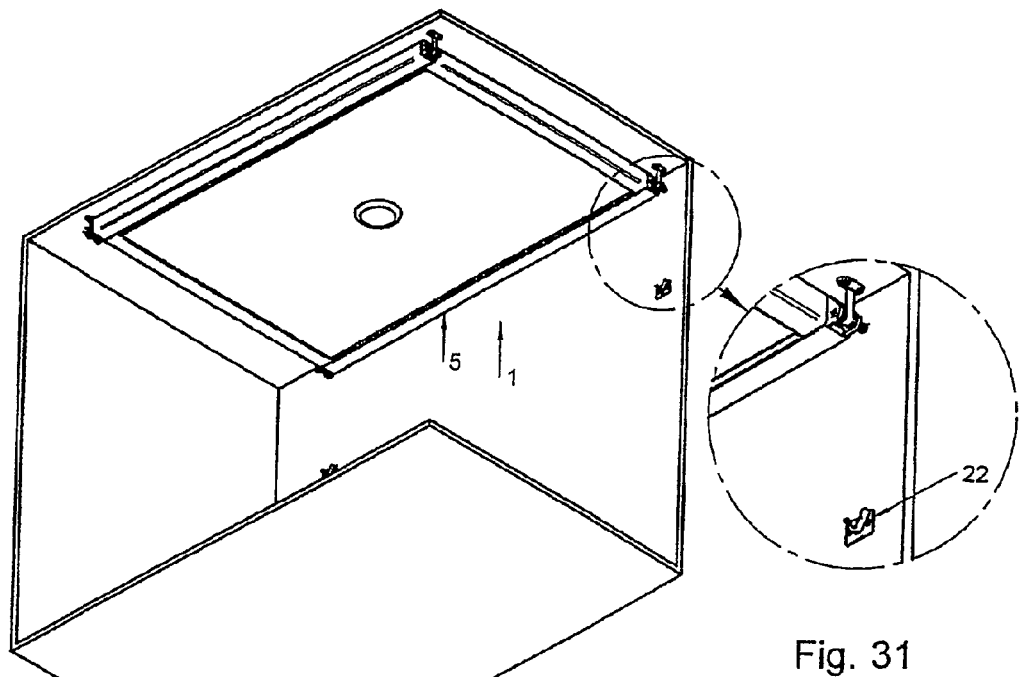
Fig. 31
Fig. 30
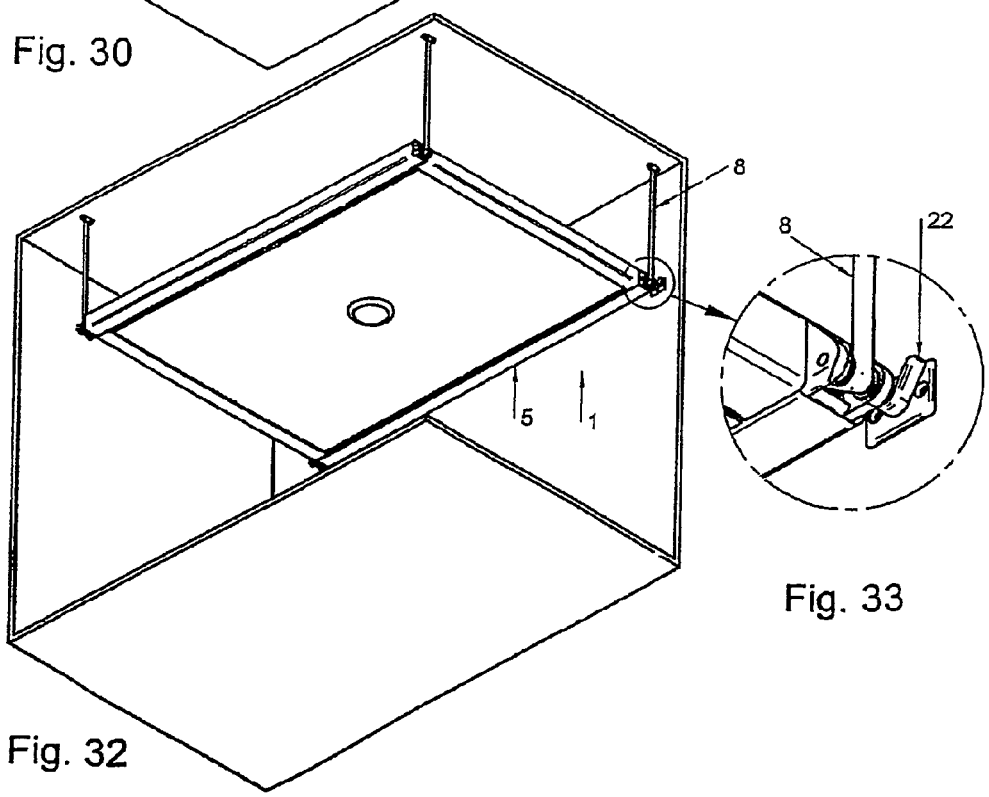
Fig. 33
Fig. 32

SO-CALLED FOLD-AWAY BED

The present finding concerns a so-called fold-away bed to be used in the fields of camping, seamanship, furnishing of bedsits and in all other dwellings where there is a lack of space, for which reason the components of the furniture must take up a minimum amount of space.

In the current state of the art so-called fold-away beds, i.e. beds that, when not in use, are positioned so as to constitute a reduced bulk, in use, for example, in caravans and campers, have one side hinged to a wall, whereas two "heads" project from the two ends of the side opposite the previous one, which slide in guides applied to the walls of the room.

Such an embodiment, in which the lifting movement of the bed takes place manually, has the drawback that the guides present on the walls of the room prevent the positioning along the aforementioned walls of wardrobes, shelves or other similar elements.

In the field of home furnishings sofa-beds and fold-away beds are widely used, which, in rest state, are closed away in recesses formed in the wall or inside wardrobes.

The primary purpose of the finding is that of making a so-called fold-away bed that, for its movement from rest state to use state and vice-versa, manually or automatically, uses mechanisms that are simple to make and easy to manoeuvre.

A further purpose of the finding is that of making a so-called fold-away bed that, in use state, is supported with simple means, which are small in size and that do not constitute any hindrance to the complete use of the bed itself.

A further purpose of the finding is that of making a so-called fold-away bed that, in rest state, constitutes an aesthetically valid and/or multifunctional furnishing element.

A further purpose of the finding is that of making a so-called fold-away bed equipped with a simple, practical and cost-effective moving system that can be applied, without modification, in any type of room, from caravans to civil dwellings.

Such purposes are accomplished by a so-called fold-away bed that, in rest state, is lifted until it comes into contact with the ceiling of the room in which it is inserted and that is characterised in that the metallic structure that supports the network consists of a single frame or two or more frames, hinged together along one side, a where one frame is hinged to the wall of the room whereas the same frame, if single, or a second or more frame, if there are two or more, is supported by cables, anchored at fixed points of the ceiling or of the walls, which also take care of moving the entire structure.

In greater detail, the aforementioned cables consist of at least two belts, or other flexible members suitable for the purpose, which support the mobile frame with a horizontal portion thereof, whereas the four vertically projecting limbs anchor, with their corresponding four ends, to the ceiling of the room; with the winding and unwinding of said belts their free length is changed and, consequently, the position in height of the supported frame and therefore of the bed varies from the lowest position, corresponding to the use state, to the lifted position, against the ceiling, corresponding to the rest state.

Constructively, in the frame supported by the belts an electric motor reducer is mounted that, through a spindle, commands two rollers, arranged at the two sides of the frame itself and on which the two belts, also arranged on the side of the frame itself, are fixed and wind/unwind simultaneously and by an equal amount; in the position opposite the motorised rollers return pulleys are applied, idle on the frame, which ease the sliding of the aforementioned belts.

With such a constructive solution the moving of the fold-away bed does not require guides or supports applied to the side walls of the room for which reason they can, advantageously, be used for the application of shelves and for placing wardrobes or other furnishing accessories.

Moreover, the motor reducer and the other return members (spindles, rollers and pulleys) are small in size for which reason they can be inserted inside the frame, which gives the bed in lifted position at least two operating advantages: the first is that of reducing the bulk of the bed to the minimum, which can therefore be lifted until it comes into direct contact with the ceiling, leaving the entire room completely free and the second is that of having the visible lower surface without unevenness for which reason it can act as a false-ceiling and, possibly, it can be equipped with a lighting system, such as a ceiling fitting, a built-in light or other similar elements.

In normal working conditions the belts, which support the entire structure, are completely unwound, for which reason the motor reducer is inactive, to the great advantage of user safety.

These and other characteristics of the finding shall be better illustrated through the description of some possible embodiments thereof, given only as a non-limiting example, with the help of the attached tables of drawings, where:

FIG. 1 (Table I) represents a front elevated view of the bed according to the finding, in rest state (completely lifted);

FIGS. 2 and 3 respectively represent front elevated and plan views of the bed according to the finding, in use position (completely lowered);

FIGS. 22 to 24 (Table XI) represent perspective views, in use and lowered position, respectively, and a detailed view of a bed with the lifting belts arranged transversally;

FIGS. 27 to 29 (Table XIII) represent perspective views, in rest and lowered position, respectively, and a detailed view of a bed without vertical guides and with the hook of the ladder;

FIGS. 30 to 33 (Table XIV) represent perspective views, in rest and lowered position, respectively, and a detailed view of a bed without vertical guides and equipped with hooks at the wall and with an end stop;

Figure 1:
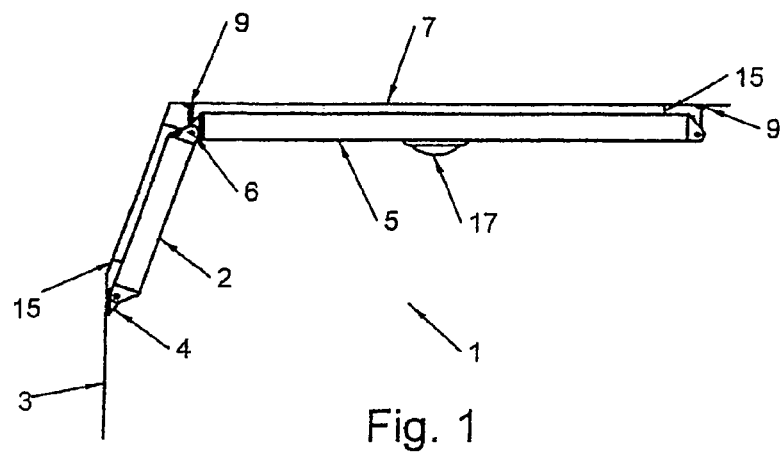
Figure 2:
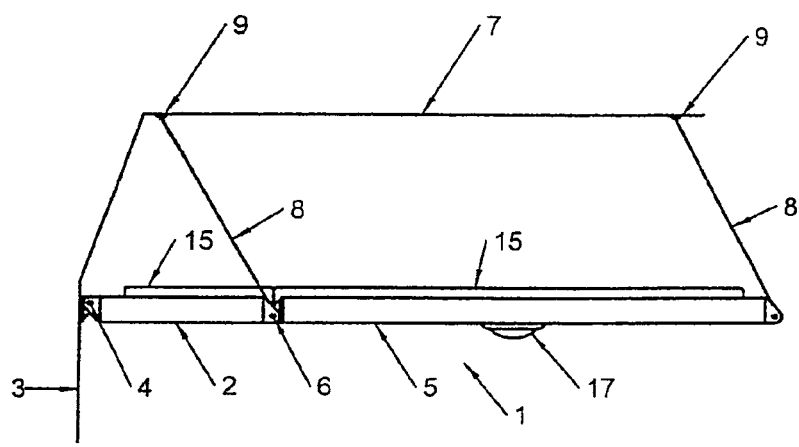
Figure 3:
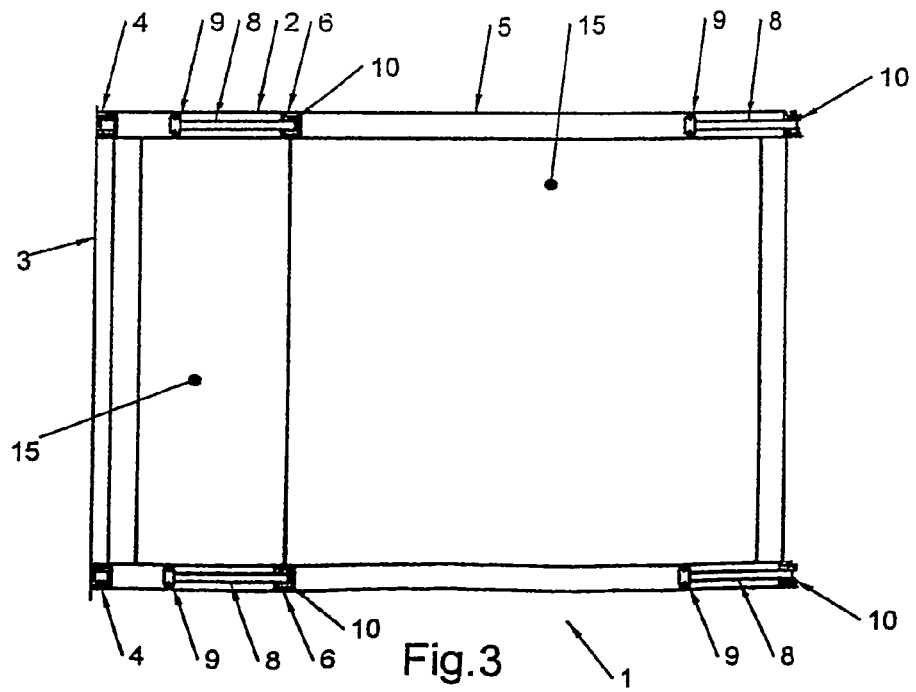
Figure 4:
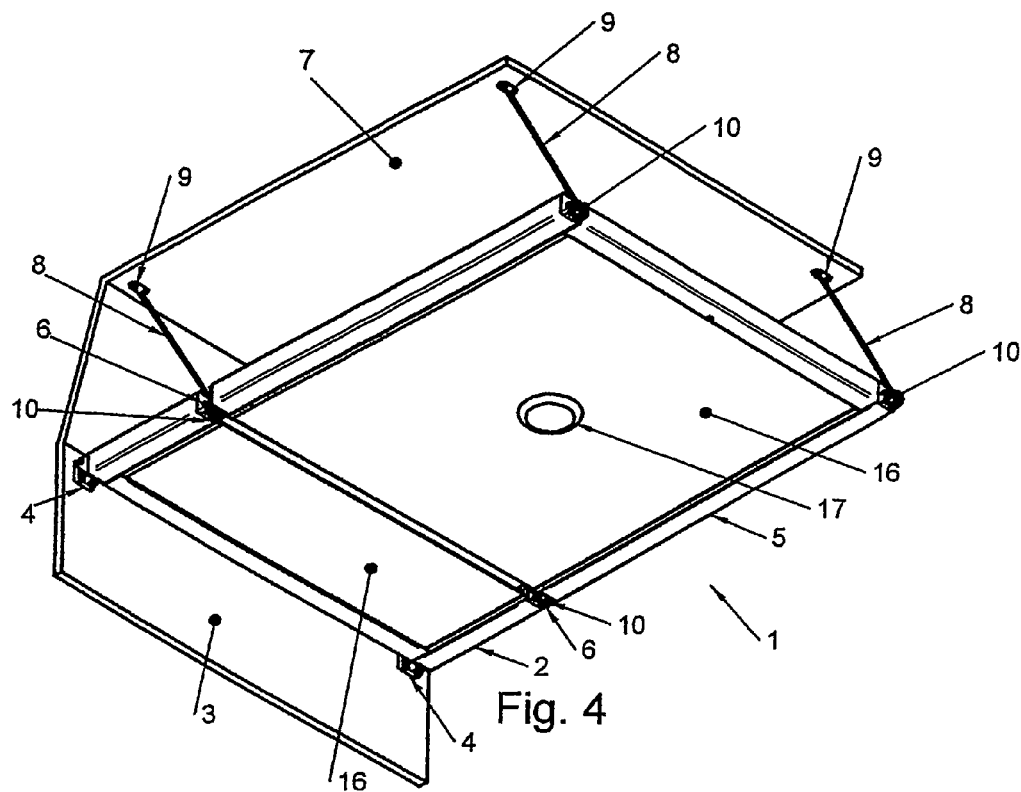
FIGS. 4 and 5 (Table II) represent two different perspective views of the bed, in use position.
Figure 5:
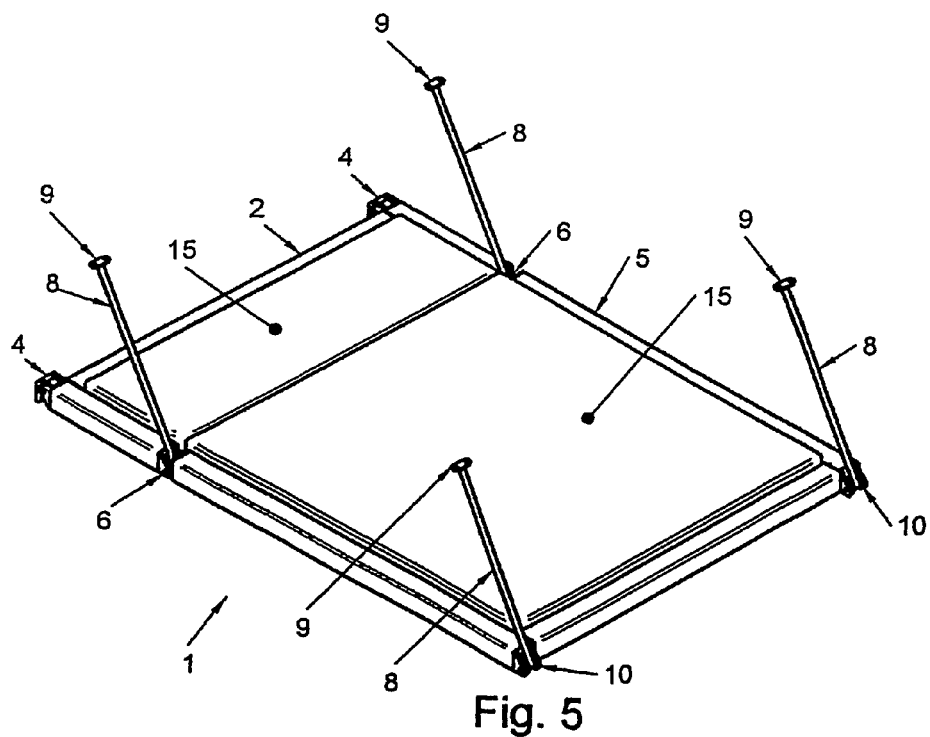
Figure 6:
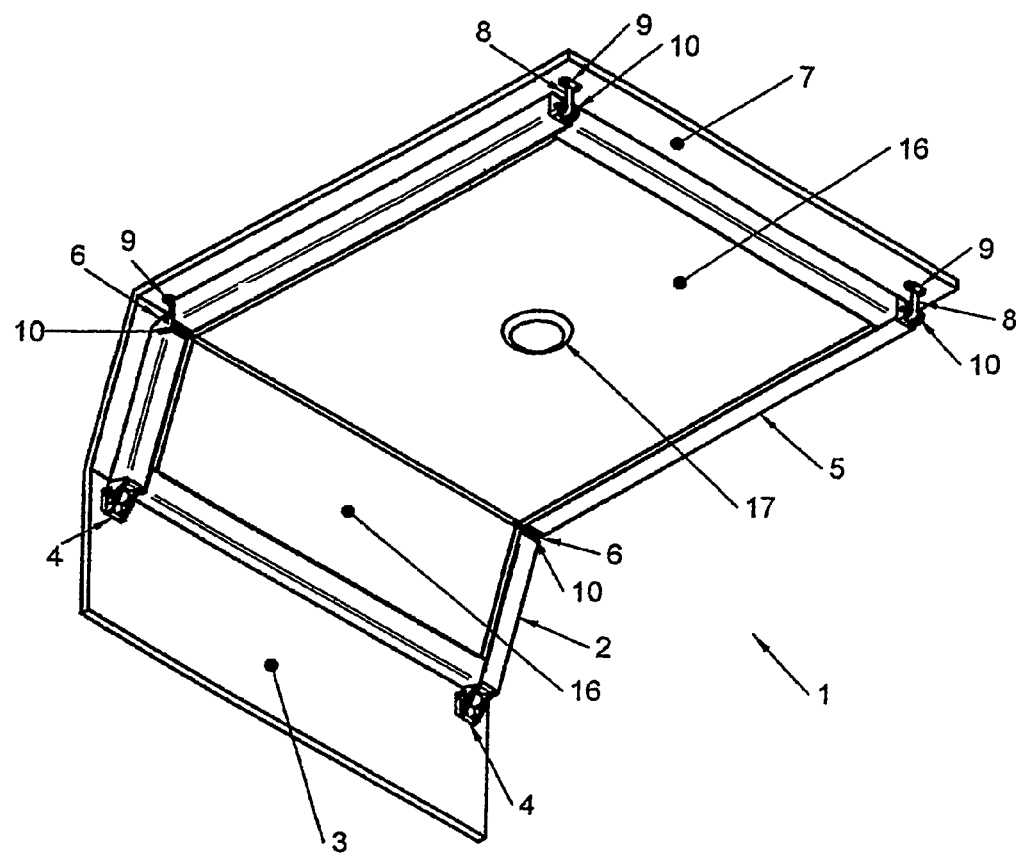
FIGS. 6 and 7 (Table III) represent two different perspective views of the bed, in rest position.
Figure 7:
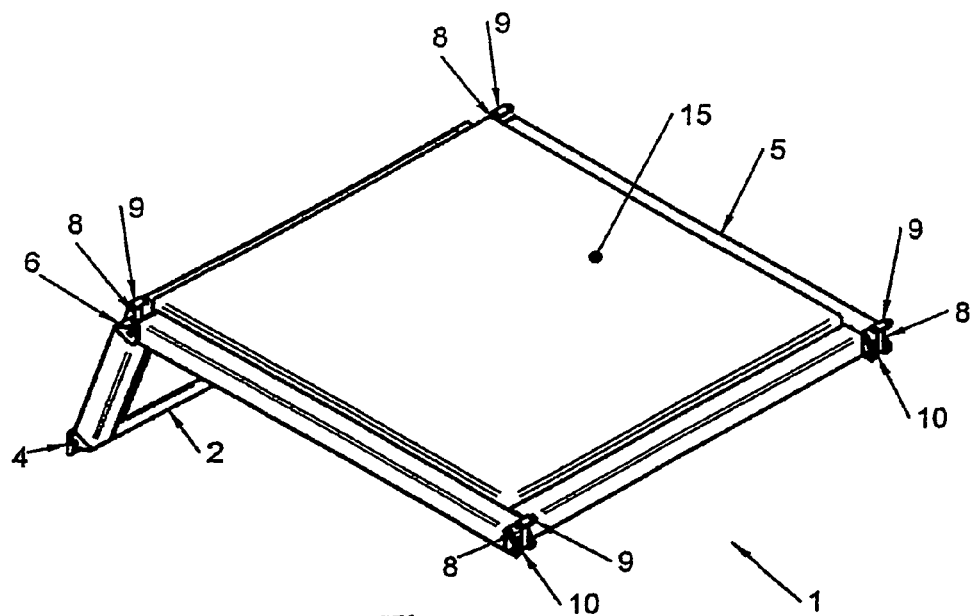
Figure 8:
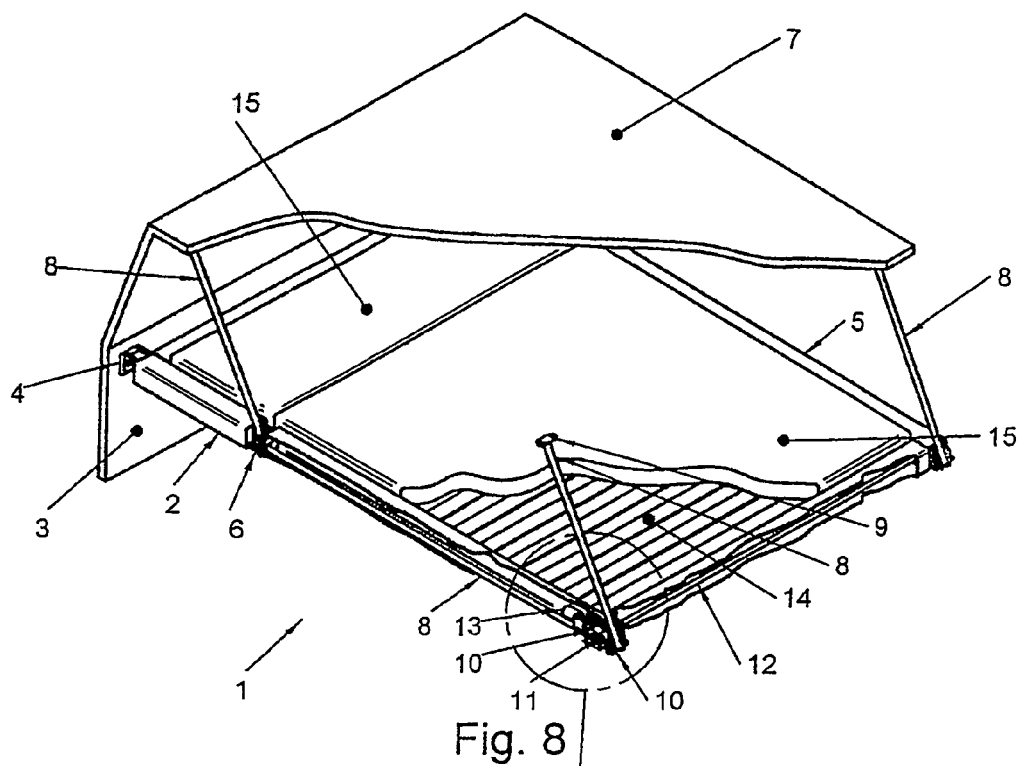
FIGS. 8 and 9 (Table IV) represent perspective views, overall and in detail, respectively, of the moving mechanism of the bed.
Figure 9:
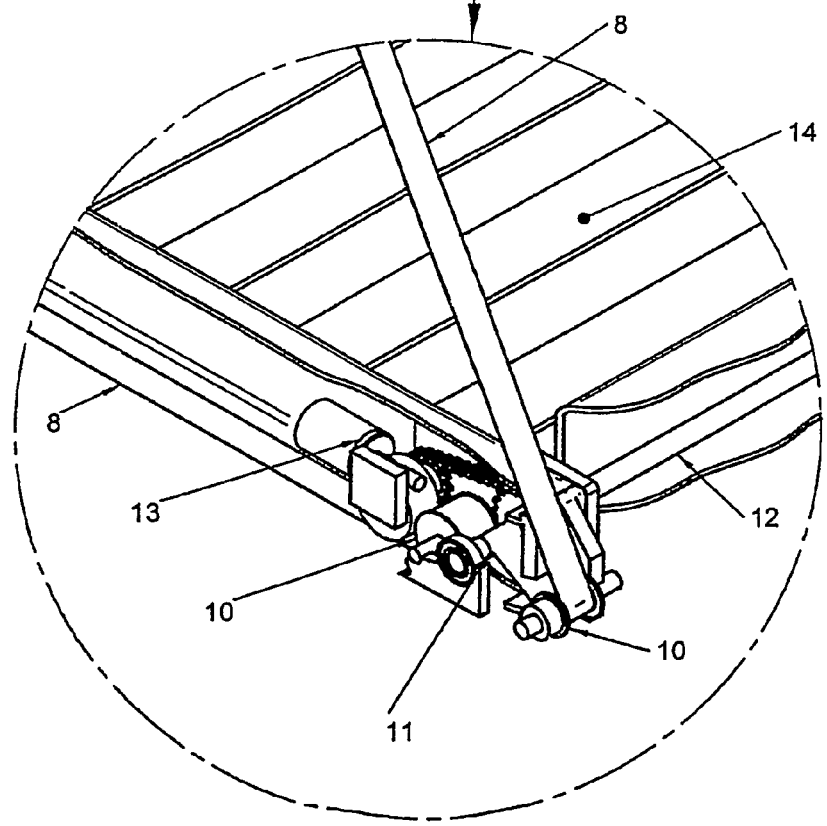

As can be seen in particular in FIGS. 1 to 9, in a preferred embodiment the so-called fold-away bed substantially consists of a metallic structure, wholly indicated with reference numeral 1, made up of two frames; a first frame 2 fixed to the wall 3 of the room through hinges 4 and that is held suspended by a pair of belts 8, which have their four ends stably anchored to the ceiling 7, at the attachment points 9.

Mounted on the frame 5 there are six return pulleys 10, three on each side, for the side belts 8 and two rollers 11, one on each side, for winding the aforementioned belts, connected together through a transversal spindle 12, actuated by a motor reducer 13.

The network 14, preferably of the type with slats, for supporting the mattress 15 is applied to the two frames 2 and 5.

The entire device is completed with a coating panel 16, for closing the frame 1 at the bottom, which acts as a false ceiling and on which there can be a lighting point 17, consisting, for example, of a ceiling fitting for lighting the room.

Operatively, as illustrated in the figures, when the bed is in use state, i.e. lowered, the belts 8 are completely unwound, for which reason the motor reducer 13, as well as being deactivated, is not subjected to loads and thanks to a correct sizing of the support members (belts, rollers and pulleys) and of the hinge 4, possible horizontal oscillations are prevented and a firm anchoring to the wall is ensured.

Again operatively, when the bed is no longer being used, with a button command or a remote control the motor reducer 13 is activated, which actuates the rollers 11, on which the belts 8 then start to wind, determining the lifting of the bed 1, until it comes into contact with the ceiling 7; this position is detected by an end stop, a timer, a torque sensor or other position detection devices, which take care of stopping the motor reducer itself.

Again operatively, the motor reducer 13 is sized so as to be able to lift the bed only when it is empty, to avoid injury to the user who is resting as a consequence of accidental actuation.

In accordance with the characteristics of the general description outlined above, the finding foresees further embodiments for making the bed more functional for the user.

Figure 10:
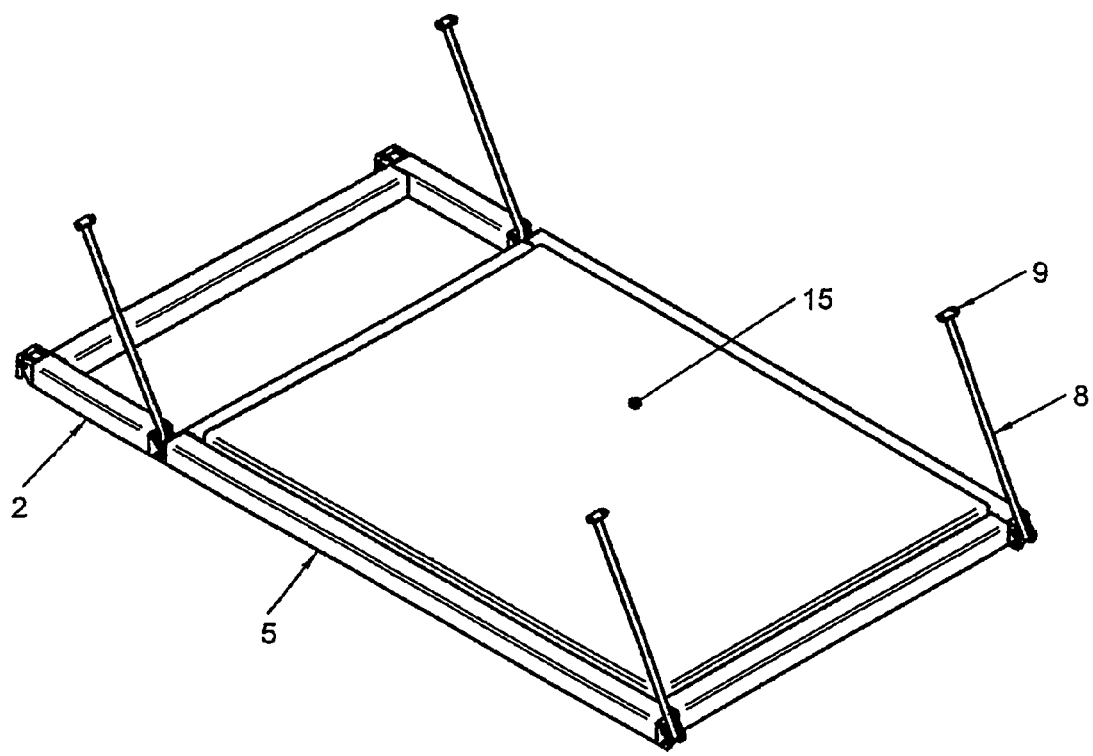
FIG. 10 (Table V) represents a perspective view of the bed that uses just the frame not fixedly connected to the wall.

As can be seen in FIG. 10, the finding foresees that just frame 5 can be used, whereas the frame 2 acts as a simple articulation element and as a stabilizer during moving and use.

Figure 11:
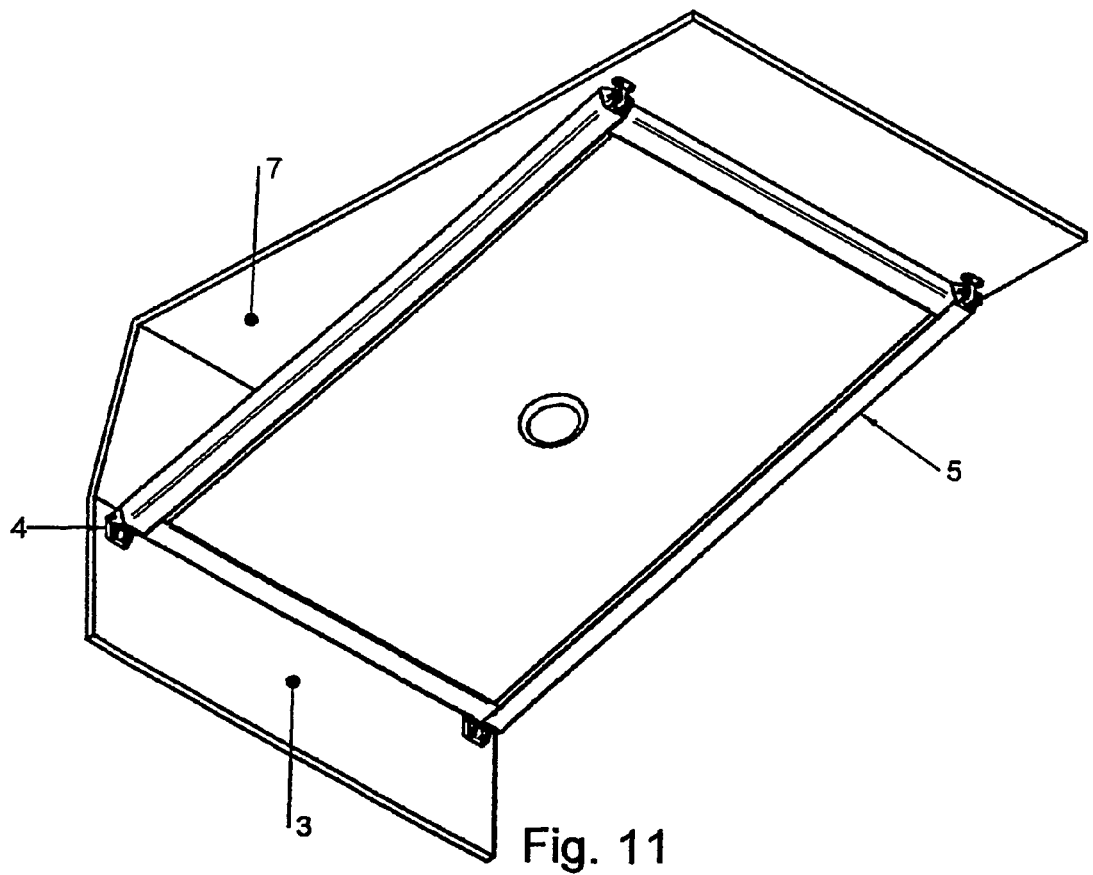
FIG. 11 represents a perspective view from below of the bed.

As can be seen in FIG. 11, the finding foresees that the metallic structure consists of a single frame 5, hinged at one side with the hinges 4 to the wall 3.

Figure 12:
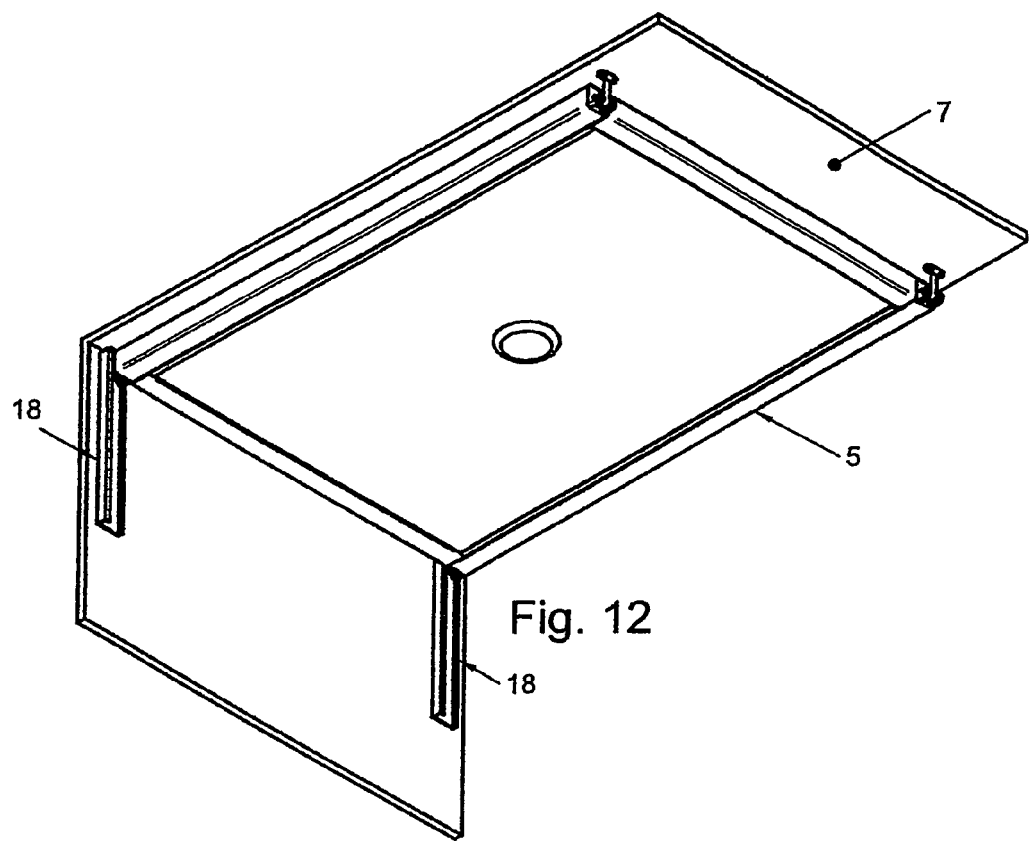
FIGS. 12 and 13 (Table VI) represent perspective views from below, in rest and lowered position, respectively, of a bed made up of just one frame, fixedly connected to slide on vertical guides integral with the wall.
Figure 13:
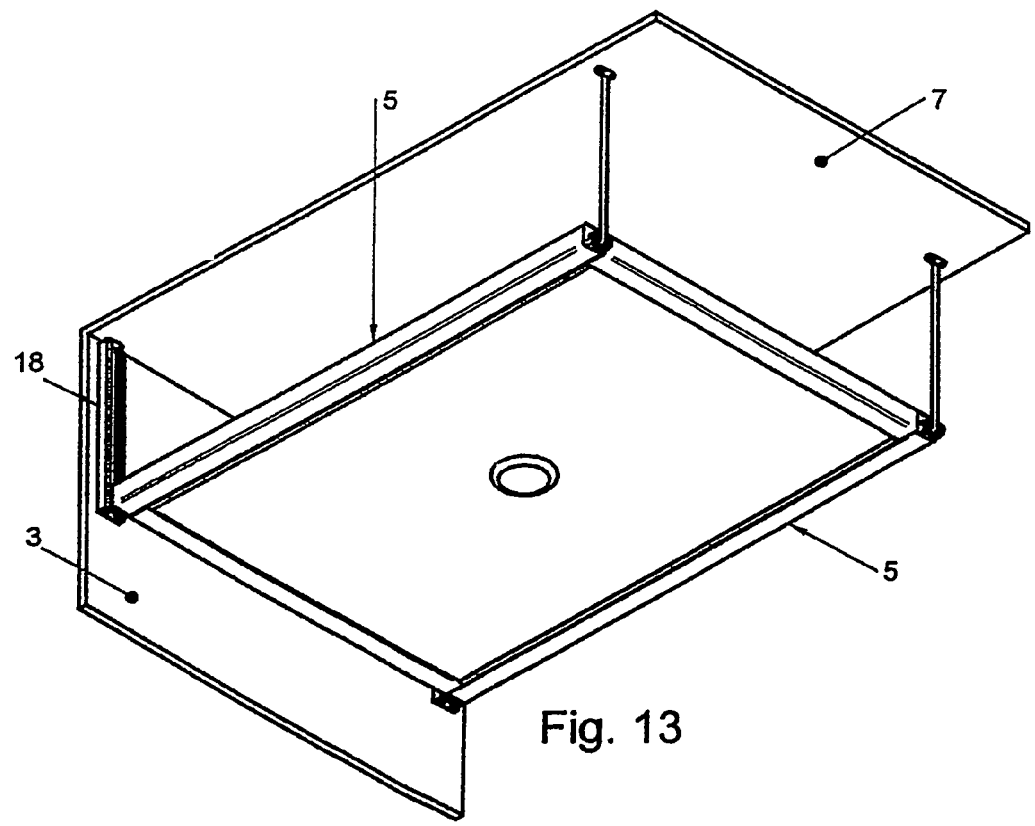

As can be seen in FIGS. 12 and 13, the finding foresees that the metallic structure of the frame an slide, on one side, on guides 18 fixed to the wall 3 or on another fixed point, which prevents the occurrence of horizontal oscillations of the bed both during use and during moving steps.

Figure 14:
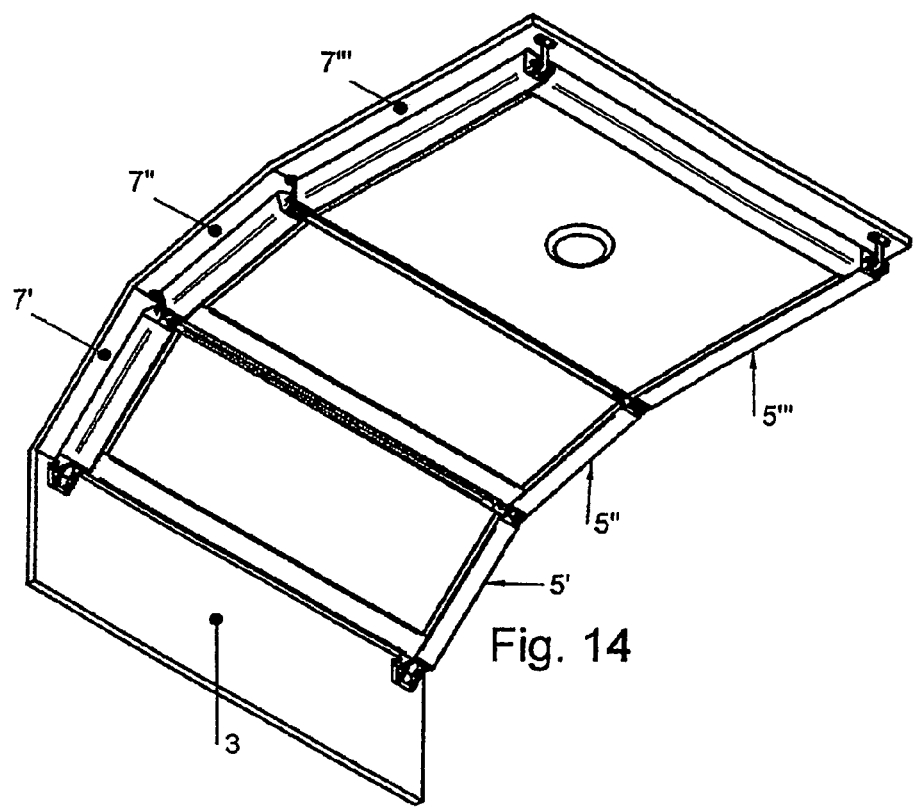
FIGS. 14 and 15 (Table VII) represent perspective views, in rest and lowered position, respectively, of a bed made up of three frames hinged together.
Figure 15:
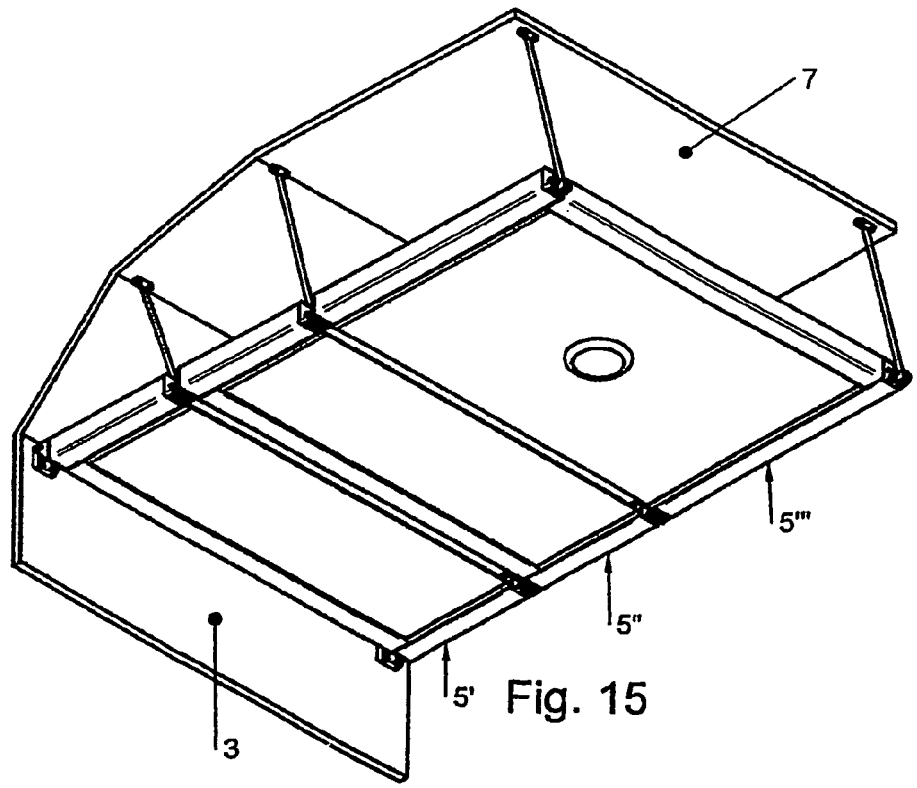

As can be seen in FIGS. 14 and 15, the finding foresees that the metallic structure is made up of a plurality of frames hinged together 5'-5"-5'" so as to be able to adapt perfectly to the configuration of the ceiling 7'-7"-7'" that is not always flat.

Figure 16:
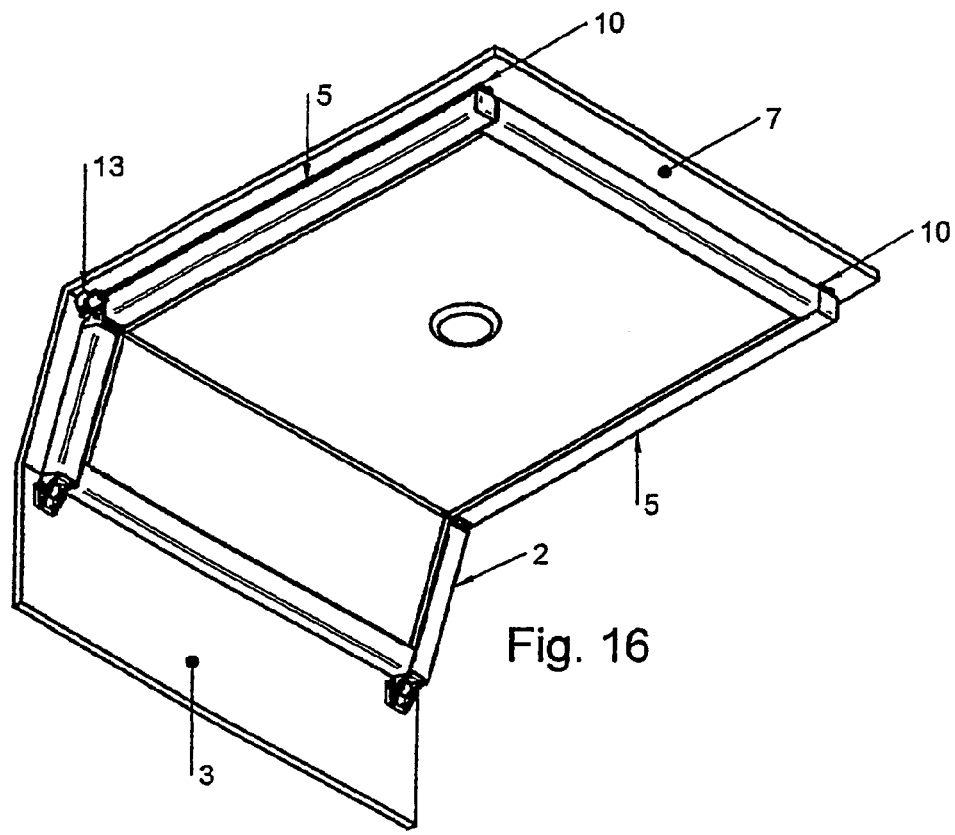
FIGS. 16 and 17 (Table VIII) represent perspective views, in rest and lowered position, respectively, of a bed in which the moving members are applied to the ceiling.
Figure 17:
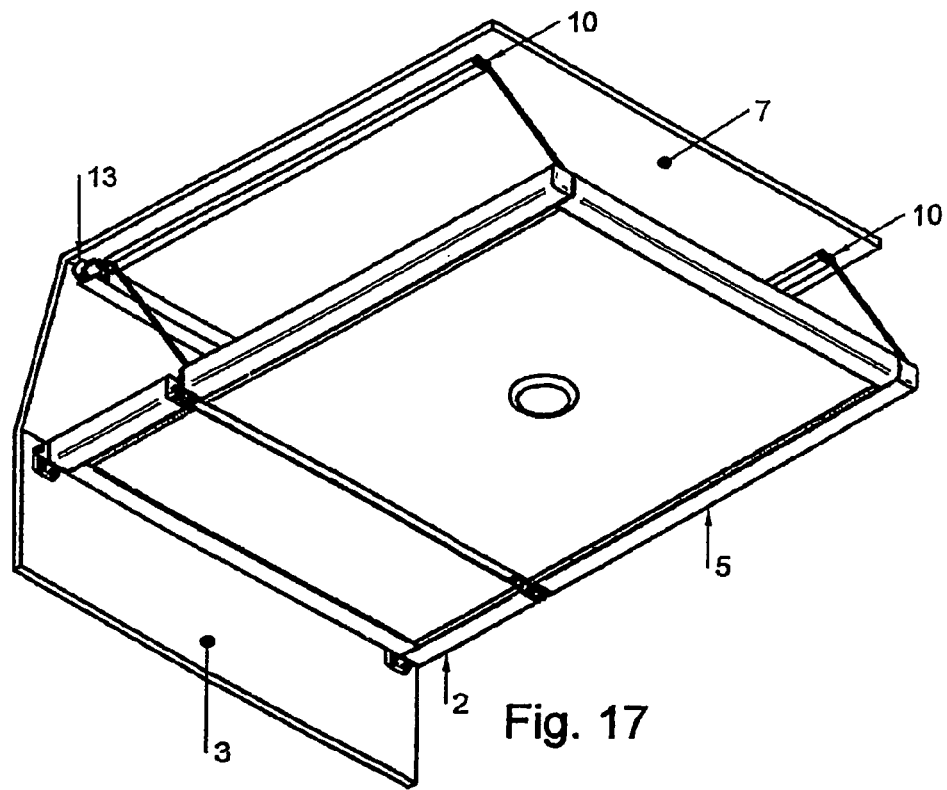

As can be seen in FIGS. 16 and 17, the finding foresees that the moving members (motor reducer 13 and pulley 10) are applied to the upper plane, such as the ceiling 7, instead of to the frame.

Figure 18:
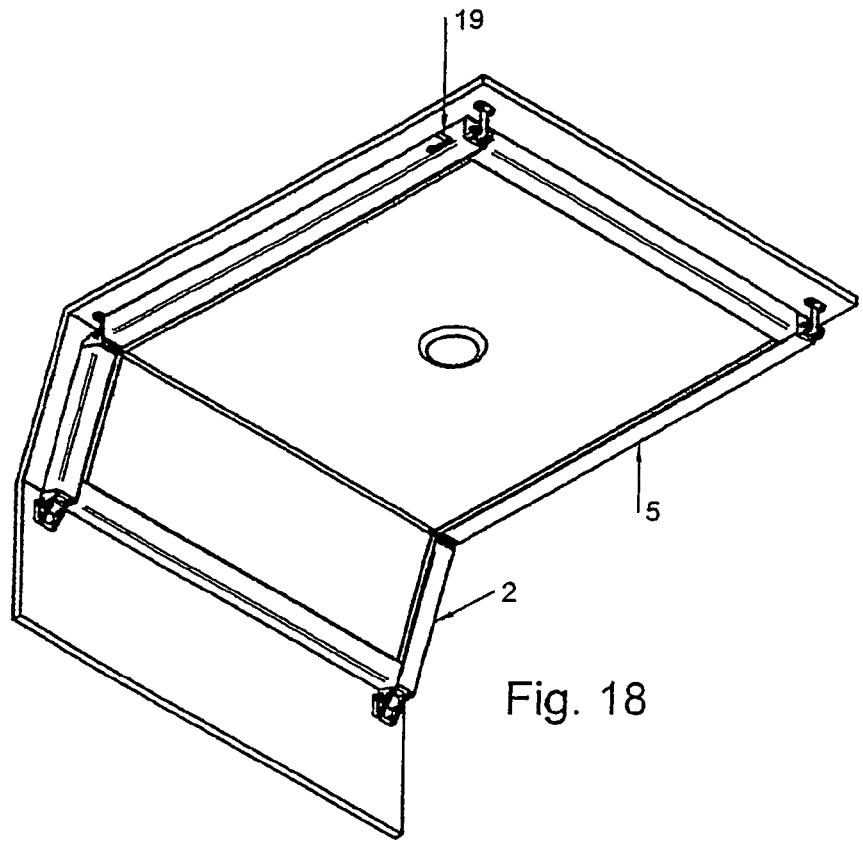
FIGS. 18 and 19 (Table IX) represent perspective views, in rest and lowered position, respectively, of a bed in which the moving members are of the manual type.
Figure 19:
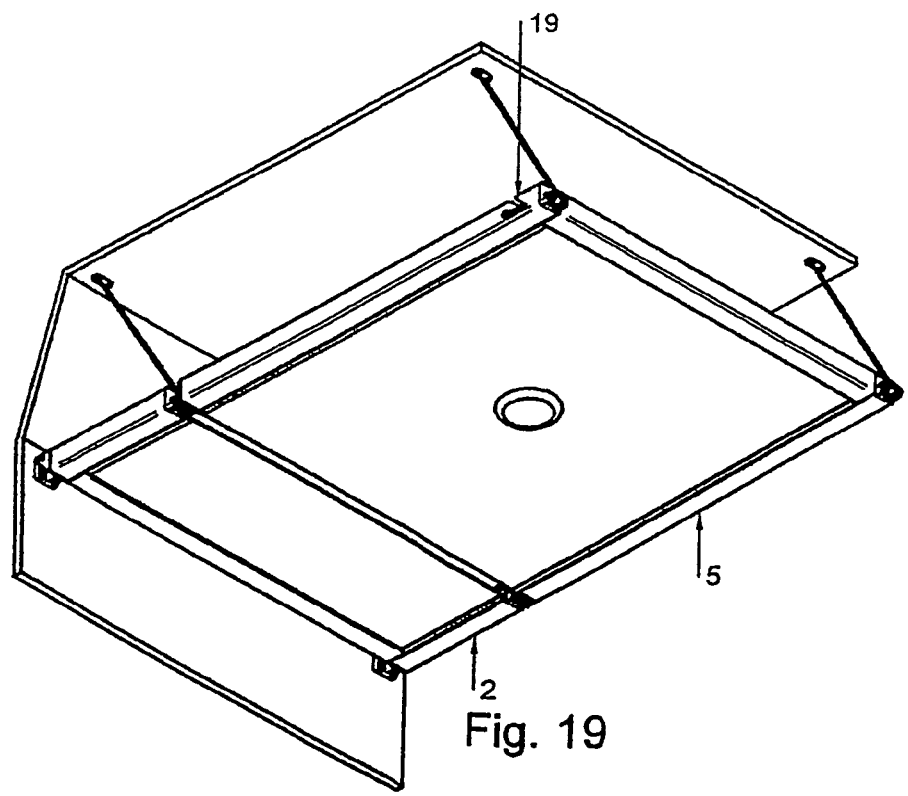

As can be seen in FIGS. 18 and 19, the finding foresees that the moving of the frame is carried out manually, with cranks or other members suitable for the purpose.

Figure 20:
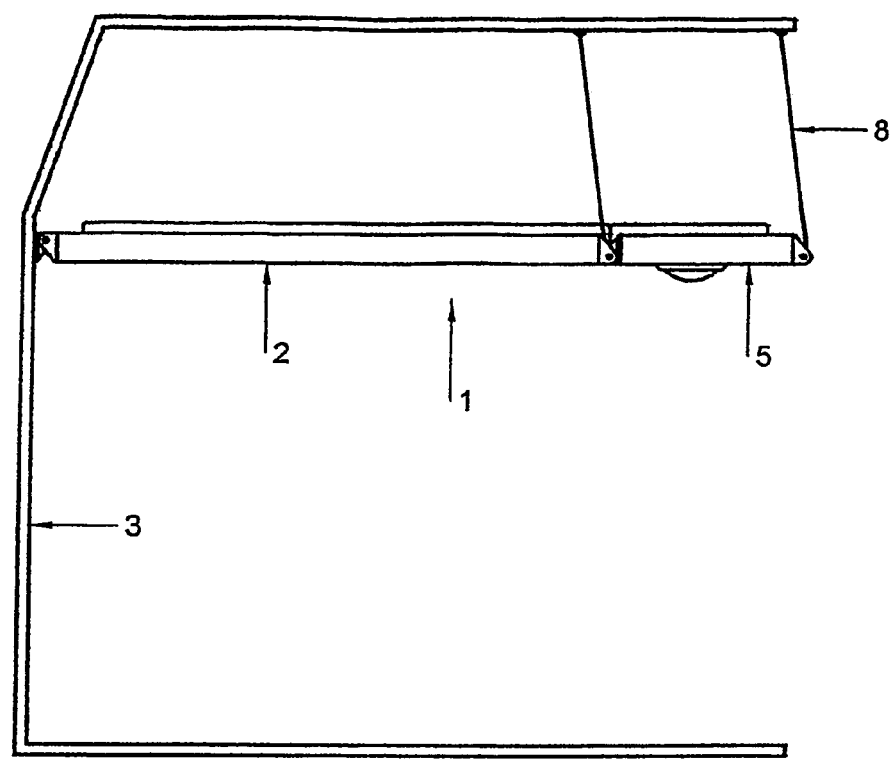
FIGS. 20 and 21 (Table X) represent perspective views of the articulated metallic structure used, respectively, as a bed and as a sofa.
Figure 21:
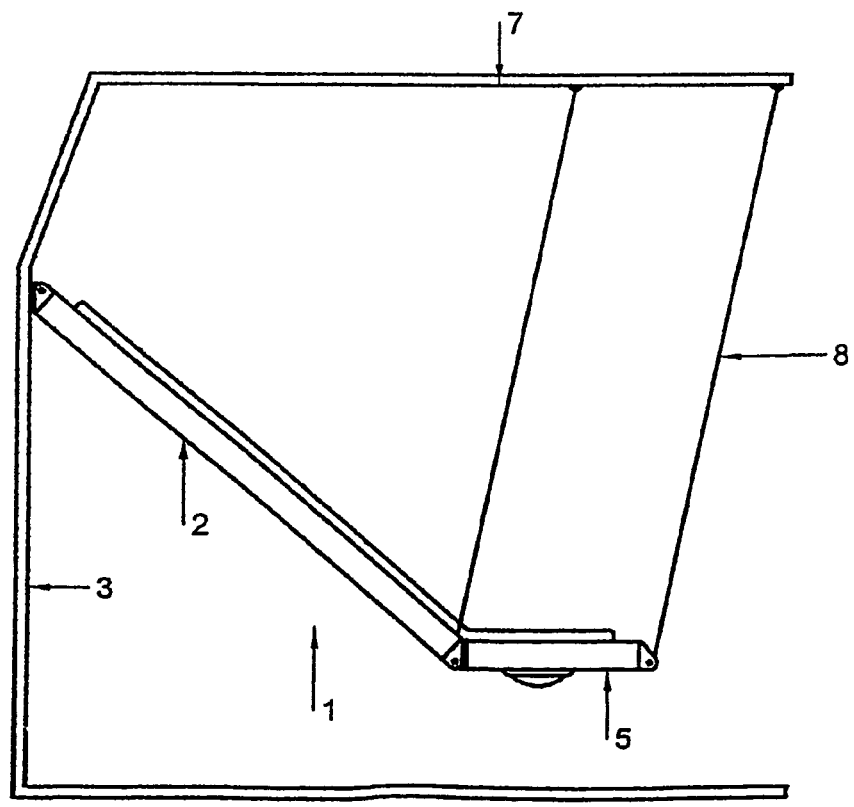

As can be seen in FIGS. 20 and 21, the finding foresees that the metallic structure 1 is articulated so that the two frames 2 and 5 act both as a bed and as a sofa.

As can be seen in FIGS. 22 to 24, the finding foresees that the belts 8 are arranged transversally, at the two shorter sides of the metallic structure 1.

Figure 25:
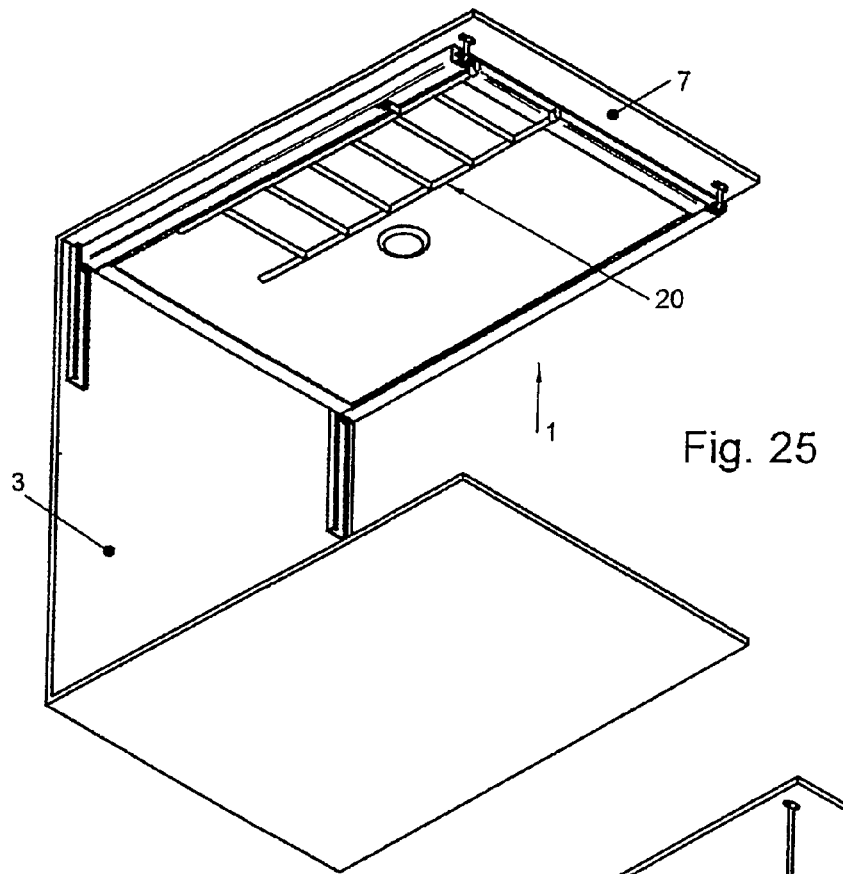
FIGS. 25 and 26 (Table XII) represent perspective views, in rest and lowered position, respectively, of a bed equipped with fold-away ladder.
Figure 26:
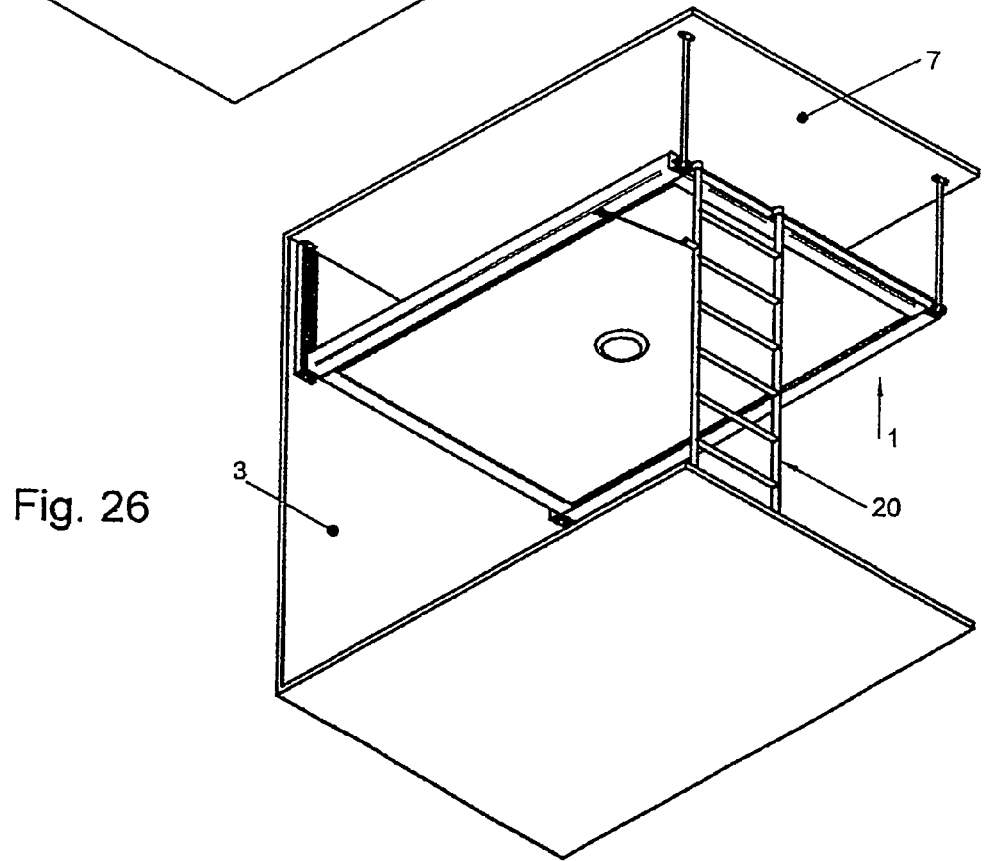

As can be seen in FIGS. 25 and 26, the finding foresees that a ladder 20 is associated with the metallic structure 1, which, with the bed in rest position, when it is raised, is folded-away.

As can be seen in FIGS. 27 to 29, the finding foresees that the entire metallic structure 1 is not fixed at any point of the walls, but is held in position by the locking action from hooks 22 applied onto at least one wall.

Figure 34:
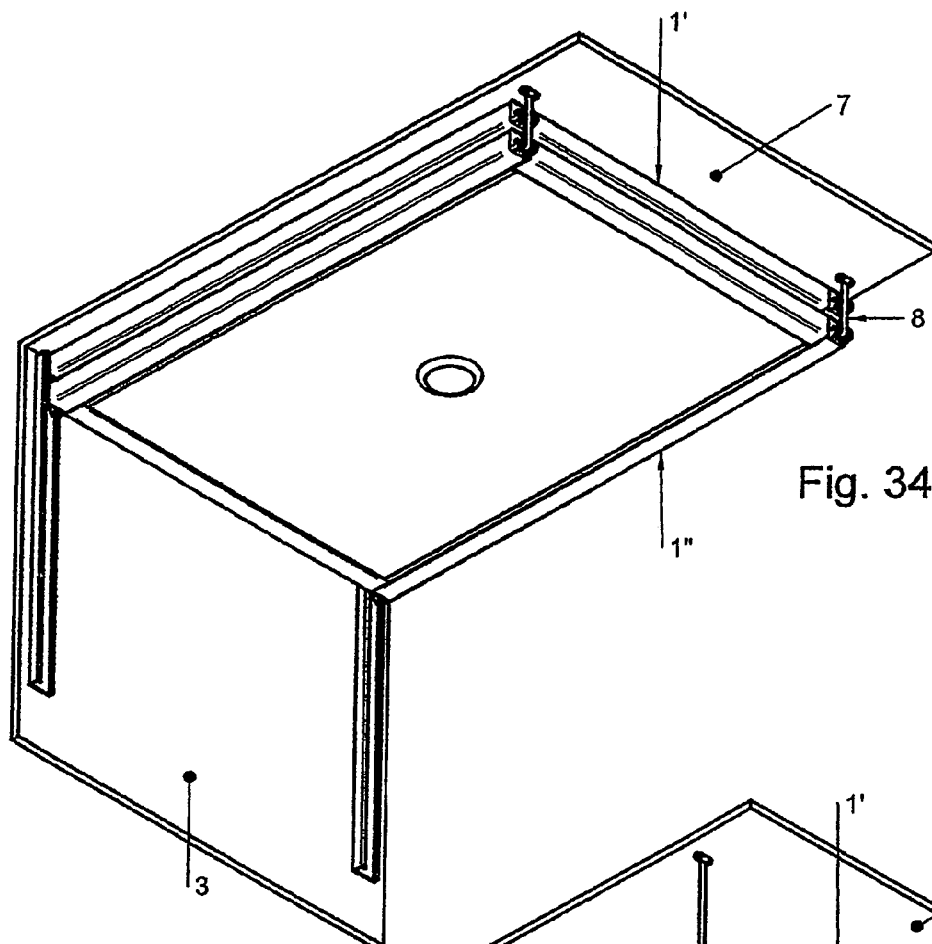
FIGS. 34 and 35 (Table XV) represent perspective views, in rest and lowered position, respectively, of a bed with two frames laid on top of one another.
Figure 35:
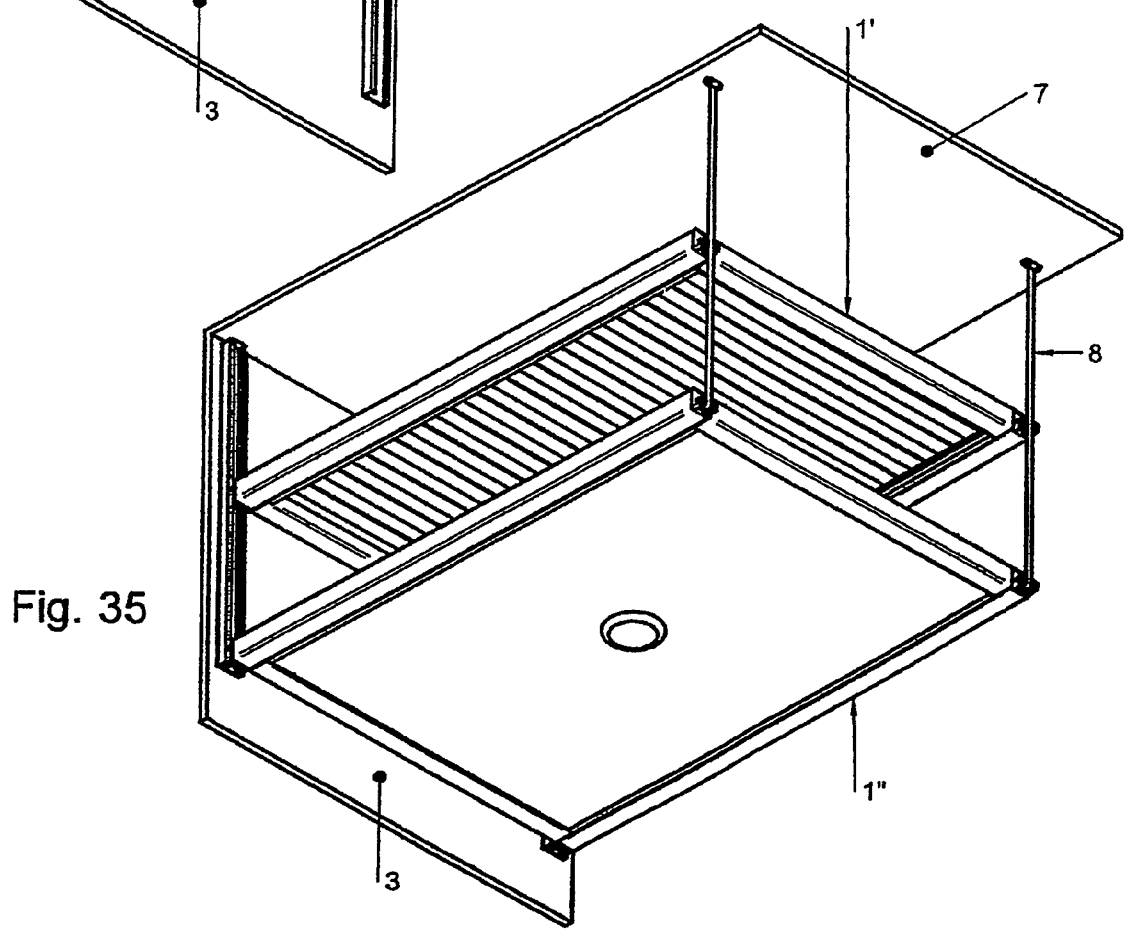

As can be seen in FIGS. 34 and 35, the finding foresees the moving of at least two metallic structures 1' and 1", to make at least two so-called bunk-beds.

The finding foresees that the metallic structure 1 is equipped with an electric socket for the use of an electric blanket.

The finding also foresees that the variation in free length of the belts 8, during the period of use is variable so as to give the bed a light alternate vertical movement, which increases the comfort of the user lying down.

Finally, the finding foresees that the variation in free length of the belts 8, necessary for moving the metallic structure 1, is carried out through linear actuators.

From that which has been described the substantial advantages obtained with the fold-away bed according to the finding are clear, which, when positioned in rest state, against the ceiling of a room, as well as not taking up lots of room, also acts as a heat insulating wall, a very favourable condition in the case of its use in campers and the like.

Of course, embodiments that are different from those described are possible, according to the type of bed to be moved, the type of room in which it is inserted and the type of moving members used, without, for this reason departing from the scope of the claims, defined hereafter.

The invention claim is:

1. A fold away bed to be used in the fields of camping, seamanship, furnishing of bedsits and in all other dwellings where there is a lack of space, for which reason the components of the furniture must take up a minimum amount of space, being provided that, in rest state, it is lifted until it comes into contact with the ceiling of the room in which it is inserted, wherein the bed comprises a metallic structure that supports a network, said metallic structure made up of two frames, a first frame being fixed to the wall of the room through hinges and a second frame, hinged along one side to the aforementioned first frame through hinges and suspended by a pair of belts, which have their ends stably anchored to the ceiling, at attachment points wherein the two frames are substantially coplanar when disposed in a use state.

2. The bed according to claim 1, wherein means are provided for winding and unwinding of said belts changing their free length and, consequently, varying the position in height of the supported frames and therefore of the bed from the lowest position, corresponding to the use state, to the lifted position, against the ceiling, corresponding to the rest state.

3. The bed according to claim 2, wherein an electric motor is mounted in the frames through a spindle, said electric motor controlling rollers and the belts which are arranged at the sides of the frames for winding and unwinding the belts in an equal amount, and in the position opposite the motorized rollers, return pulleys are idlely provided on the frames, which ease the sliding of the aforermentioned belts.

4. The bed according to claim 1, wherein mounted on the second frame there are six return pulleys, three on each side, for the pair of belts and two rollers, one on each side, for winding the aforementioned belts, connected together through a transversal spindle, actuated by a motor reducer, the network being applied on the two frames preferably in the form of slats, for supporting a mattress.

5. The bed according to claim 4, wherein the metallic structure is completed with a coating panel, for closing the frames at the bottom, which acts as a false ceiling and on which there can be at least one lighting point, comprising, for example, a ceiling fitting for lighting the room.

6. The bed according to claim 4, wherein, when the bed is in a use state, i.e. lowered, the belts are completely unwound and the motor reducer, is deactivated and not subjected to loads.

7. The bed according to claim 4, wherein, when the motor reducer is no longer being used, a button command or a remote control then activates the motor reducer which actuates the rollers, on which the belts then start to wind, determining the lifting of the bed until it comes into contact with the ceiling, the position of the metallic structure being detected by an end stop, a timer, a torque sensor or other position detection devices, which stop the motor reducer itself.

8. The bed according to claim 4, wherein the motor reducer is sized so as to be able to lift the bed only when it is empty.

9. The bed according to claim 1, wherein the metallic structure is equipped with an electrical socket for the use of an electric blanket.

10. The bed according to claim 1, wherein the free length of the belts, during the period of use is continuously variable so as to give the bed a light, alternate vertical movement.

11. The bed according to claim 1, wherein the variations in the free length of the belts, necessary for moving the metallic structure, is carried out through linear actuators.

\* \* \* \* \*